Patented Apr. 24, 1928.

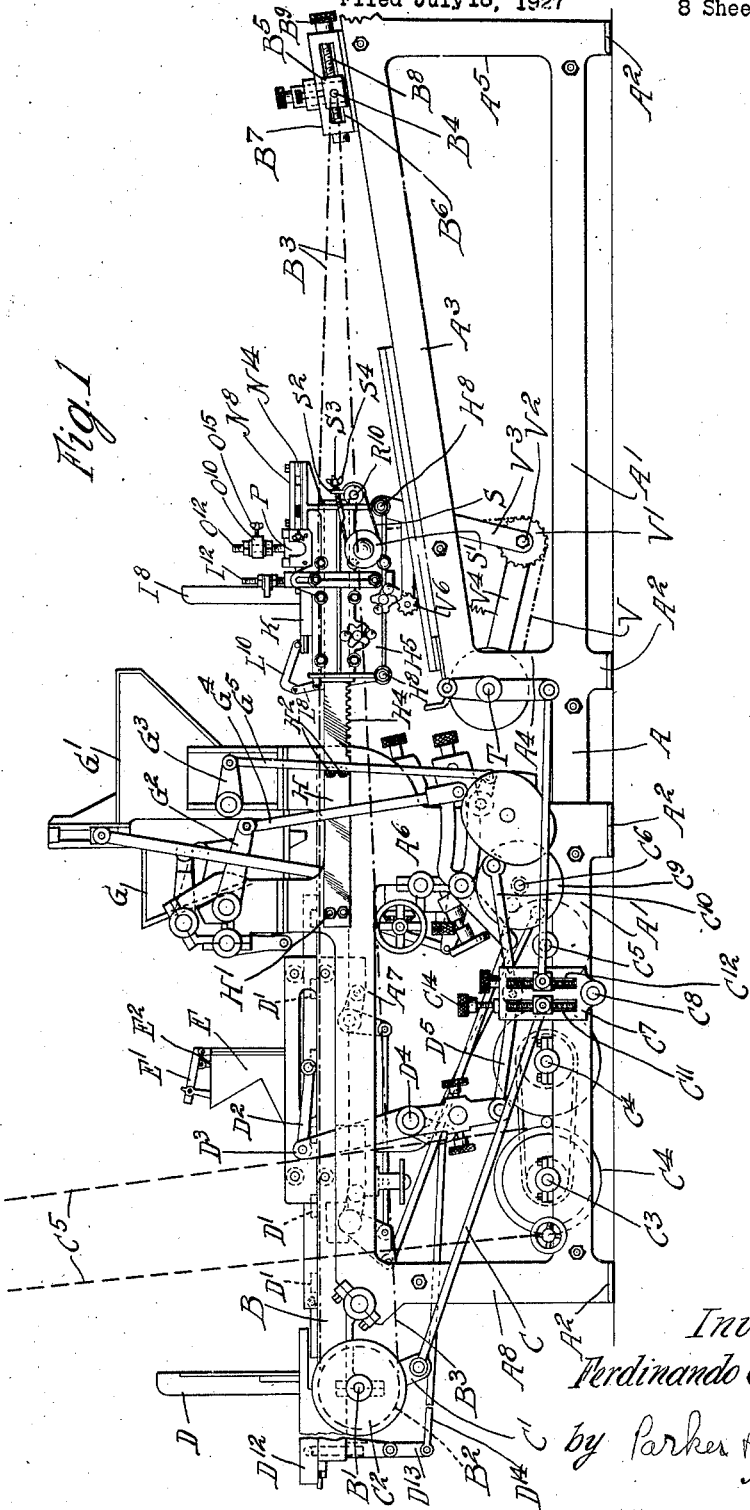

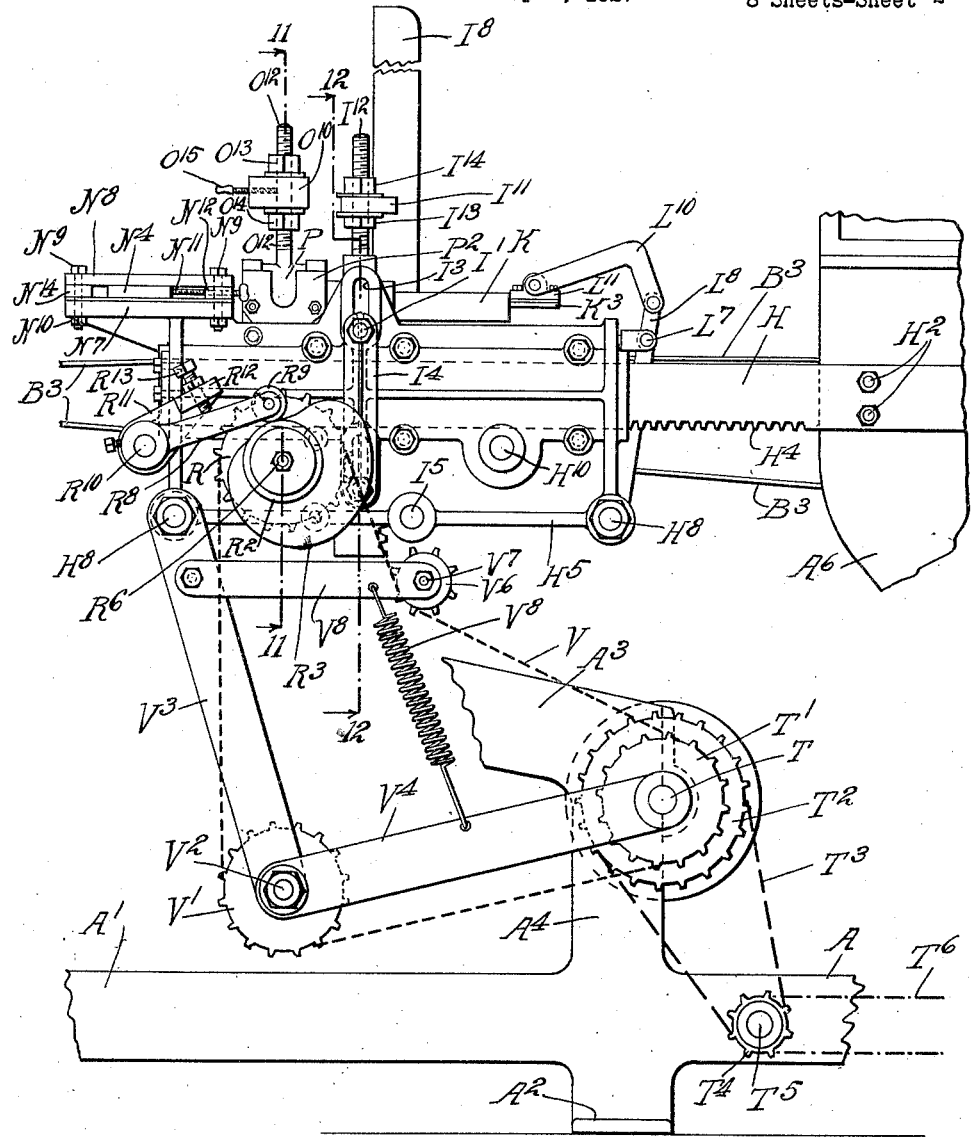

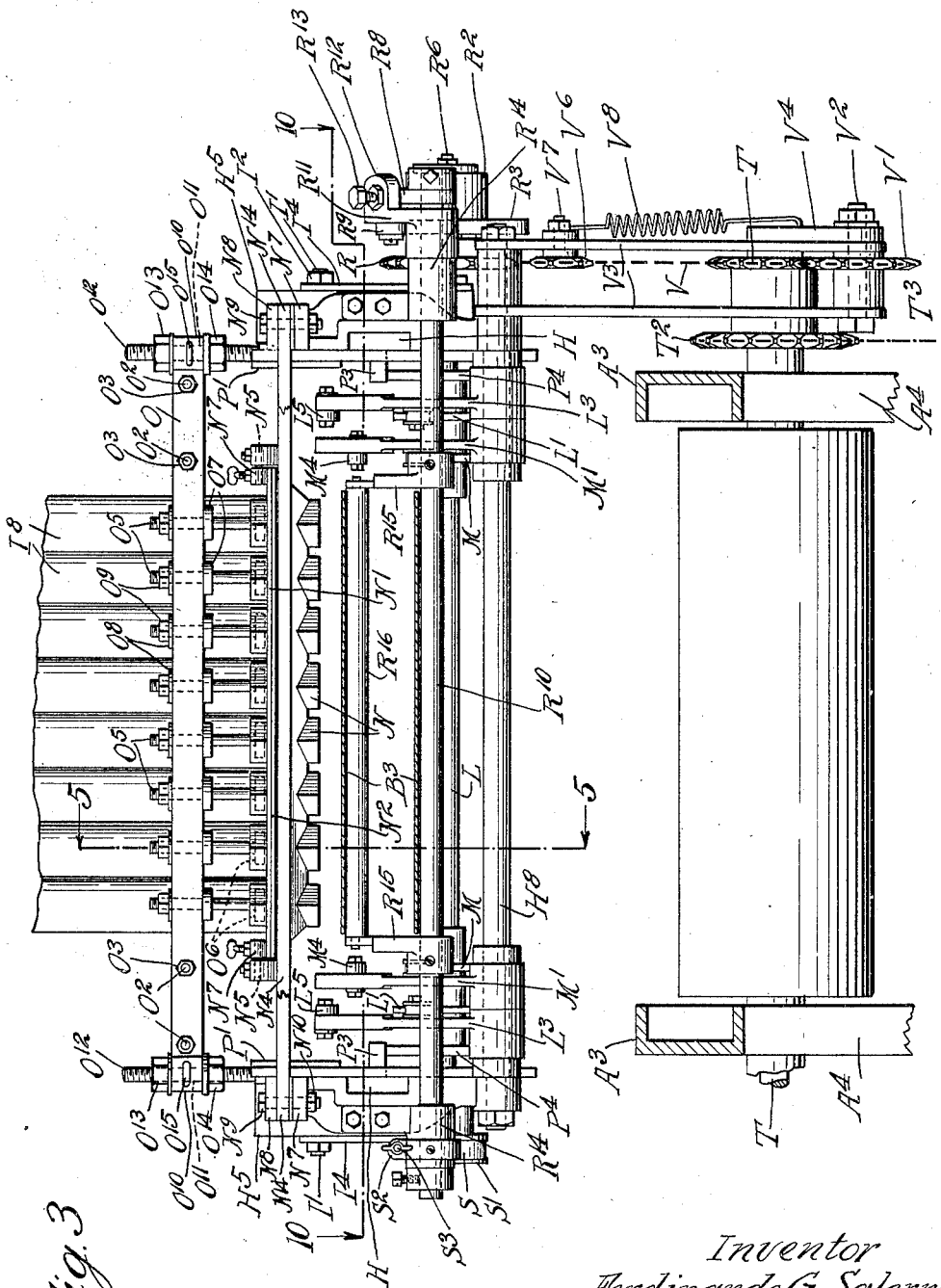

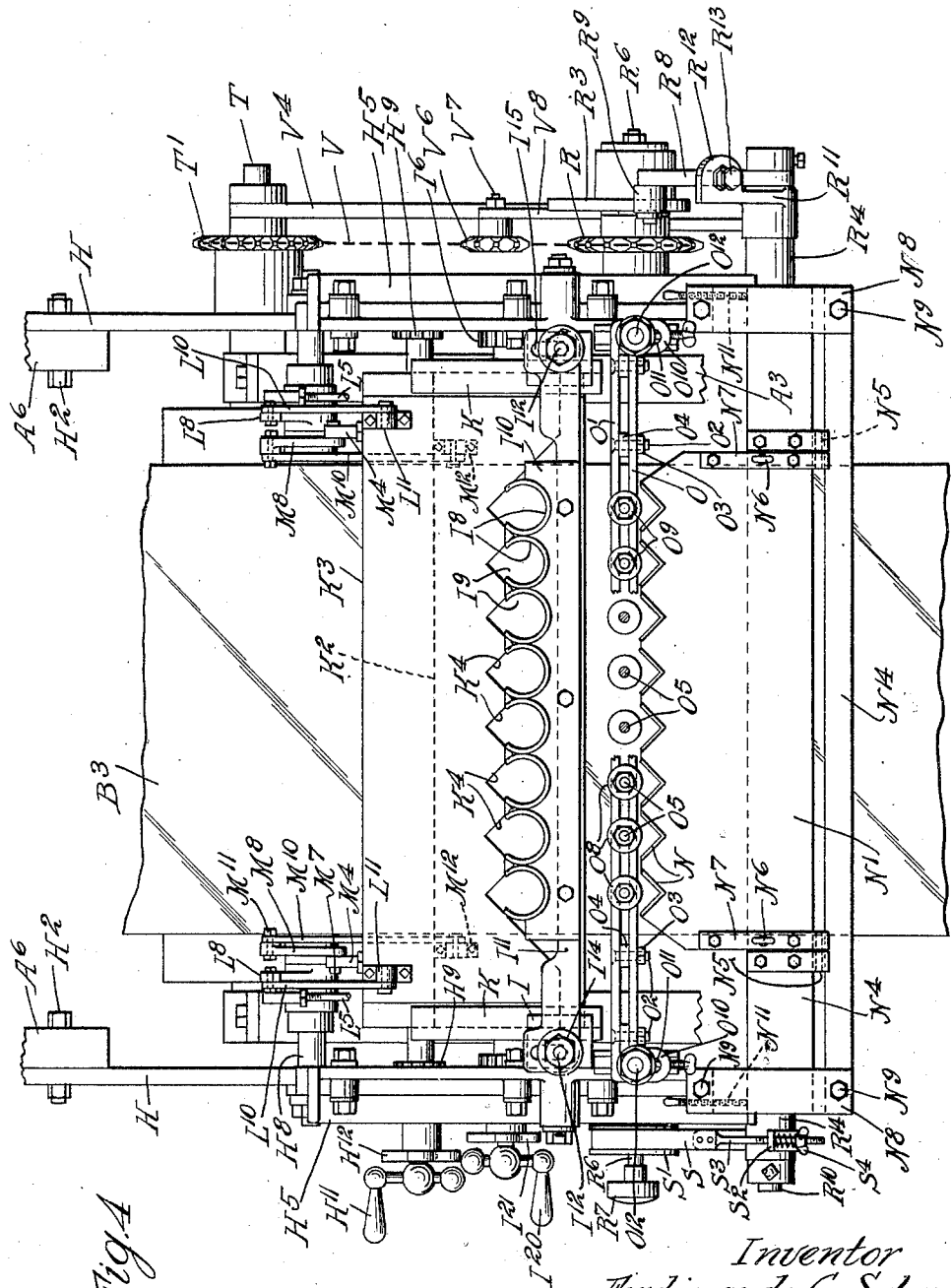

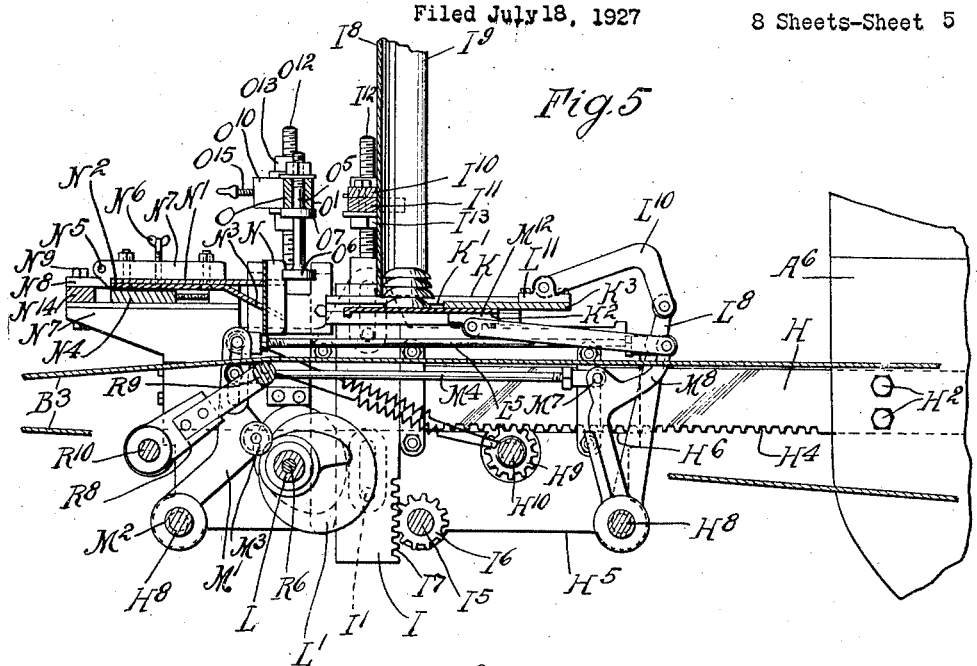
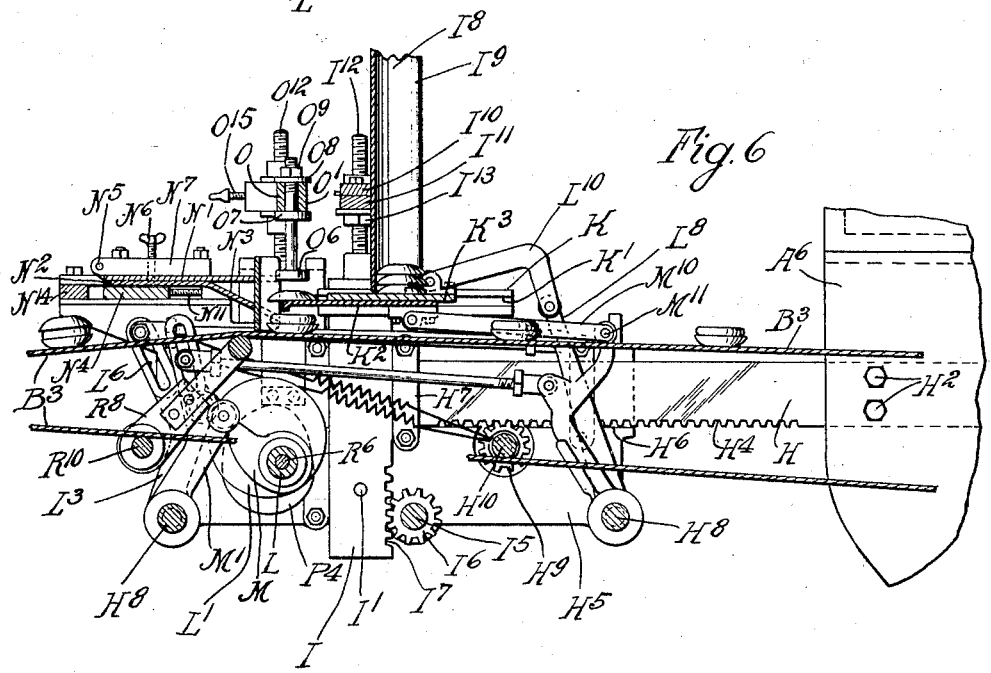

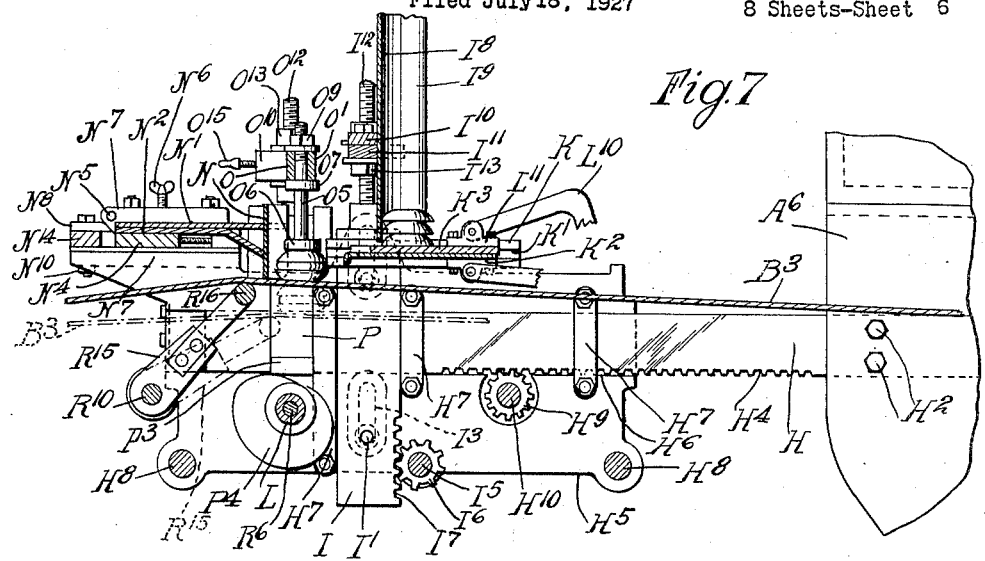

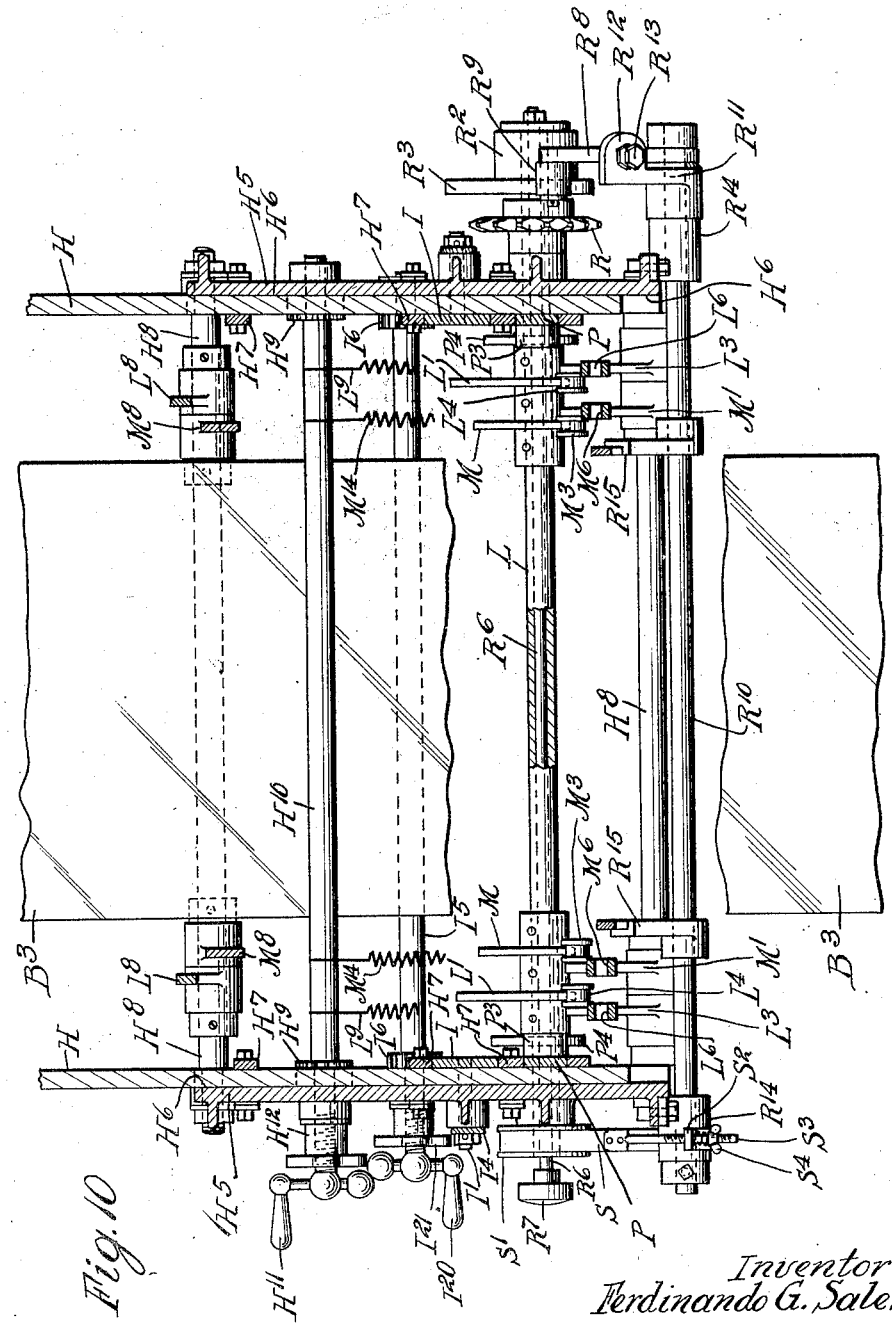

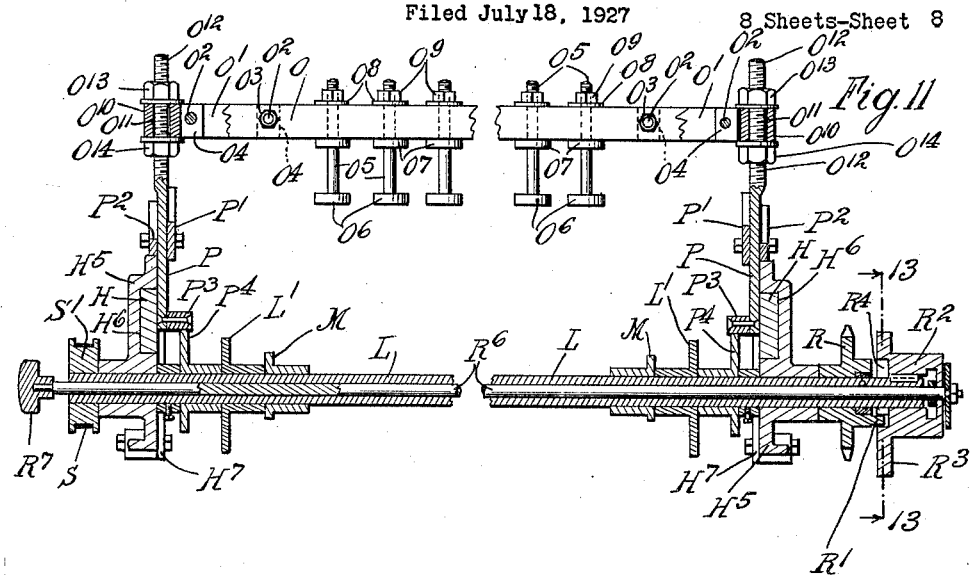
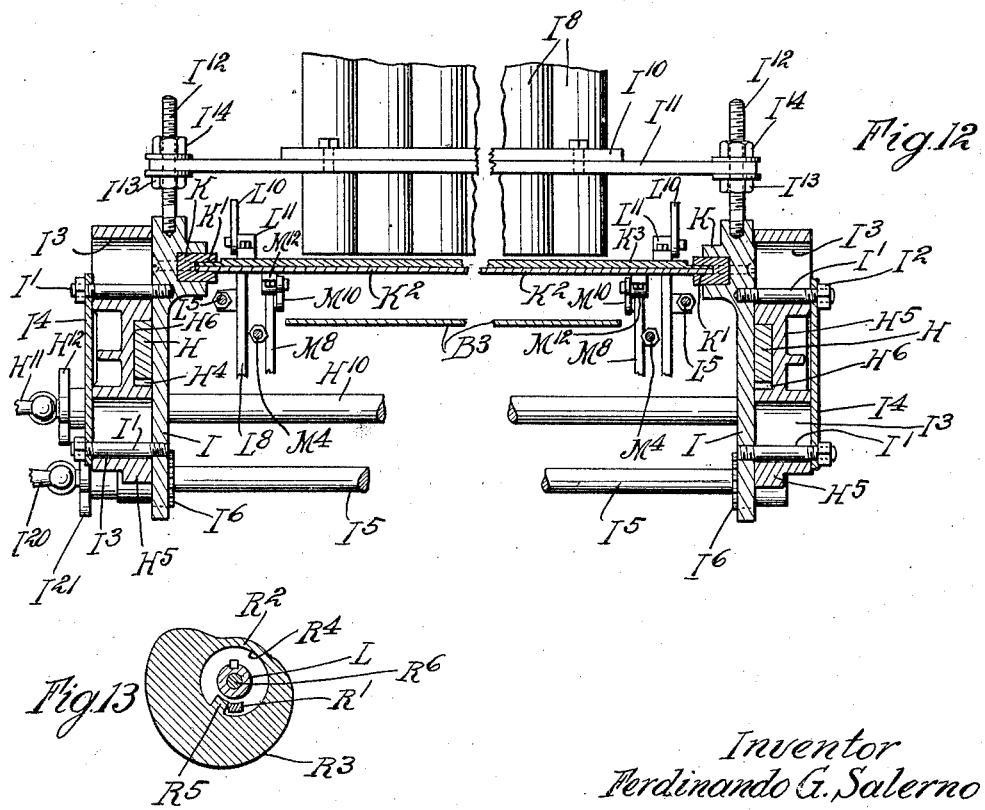

1,667,692

UNITED STATES PATENT OFFICE.

FERDINANDO G. SALERNO, OF CHICAGO, ILLINOIS.

BISCUIT-HANDLING MACHINE.

Application filed July 18, 1927. Serial No. 206,744.

My invention relates to a sandwiching machine and has for its general purpose to provide means for placing the upper sandwich member upon the lower. The invention relates to sandwiching means for assembling and delivering sandwiches formed of an upper and lower member with a layer of some softer material, such as jelly, icing or the like, or any combination thereof, between the sandwich members. It is particularly adaptable to machines for making sandwiches of biscuits, cookies, small flat cakes and the like. One object is the provision of means for delivering the upper sandwich member which shall be adjustable along the sandwiching machine, which shall be adjustable to various types and shapes of sandwich elements and which shall be adjustable to various lateral spacing of parallel streams of sandwich members passing side by side through the machine for the simultaneous formation and transportation of a number of parallel rows of sandwiches.

Other objects will appear from time to time in the course of the specification and claims.

I illustrate my invention more or less diagrammatically in the accompanying drawings, wherein—

Figure 1 is a side elevation;

Figure 2 is a detailed side elevation on an enlarged scale of the side opposite that shown in Figure 1;

Figure 3 is an end view of the structure shown in Figure 2, regarding the structure from the left, as shown in Figure 2;

Figure 4 is a plan view of the structure shown in Figures 2 and 3;

Figure 5 is a section on the line 5—5 of Figure 3;

Figure 6 is a similar section with parts in a different position;

Figure 7 is a similar section with parts in a third position;

Figures 8 and 9 are diagrammatic views illustrating the movement of the parts as shown in Figures 5, 6 and 7;

Figure 10 is a section on the line 10—10 of Figure 3;

Figure 11 is a section on the line 11—11 of Figure 2;

Figure 12 is a section on the line 12—12 of Figure 2, with parts broken away; and Figure 13 is a section on the line 13—13 of Figure 11.

Like parts are indicated by like symbols throughout the specification and drawings.

Referring first to Figure 1 A generally indicates any suitable supporting frame work having the main lower horizontal element $A^1$ with the various supporting feet $A^2$. To the right of Figure 1 is illustrated the generally horizontal or slightly upwardly inclined supporting member $A^3$, supported at one end by the vertical support $A^4$ and at the other by the vertical support $A^5$. It will be understood that the frame members above described are in pairs, at opposite sides of the device. To the left of $A^4$ as shown in Figure 1, is the upwardly projecting pair of main supports $A^6$. Secured to it, or formed integrally with it are the horizontal frame members $A^7$ supported at their opposite ends by the verticals $A^8$.

Mounted upon the horizontal members $A^7$ is a generally horizontal frame work B. Mounted upon it as shown to the left of Figure 1 is any suitable belt shaft $B^1$. Mounted upon it is the belt roller or pulley $B^2$, shown in dotted line, preferably held against rotation in relation to the shaft $B^1$. Extending about the pulley $B^2$ is the endless belt $B^3$ which extends from end to end of the frame A, passing about any suitable shaft or rod $B^4$ mounted in the take-up blocks $B^5$ which may be adjusted along the slots $B^6$ of the take-up member $B^7$. The take-up is effected by rotation of any suitable worm or screw $B^8$ by the handle knob $B^9$.

I may provide any suitable means for imparting a step by step movement to the shaft and thus an intermittent movement to the belt, the details of such mechanism not forming of themselves any part of the present invention. I have indicated a link or rod C extending to and pivoted to a lever $C^1$ associated with any suitable housing or enclosure $C^2$ within which may be any desired mechanism, for example a dog and pawl, adapted to impart the desired intermittent rotation of constant direction to the shaft.

$C^3$ indicates the main drive shaft with its pulley $C^4$ adapted to be rotated by a belt $C^5$ from any suitable power source. Any suitable driving connections may be employed including for example the intermediate shafts $C^4$, $C^5$ and $C^6$, for oscillating the adjusting lever block $C^7$ which is pivoted as at $C^8$ on the frame. I may employ for example the crank $C^9$ on the intermediate shaft $C^6$ which may be connected by the link C¹⁰ with the block C⁷. C¹¹ C¹² are adjusting slots in said block and it will be seen that the excursion of the linkage rod C may be varied by rotation of the screw handle C¹⁴. It will be realized that the main function of the device is to receive a plurality of biscuits, cakes or the like and pass them beneath various mechanisms for positioning jelly or filling or other substances upon them, and, if desired, for subsequently positioning a second biscuit or the like to make a sandwich. I therefore provide, adjacent the receiving end of the belt B³ any suitable feeding mechanism for delivering to said belt a succession of the articles being handled thereby. The mechanism for feeding such articles to the belt being well known I have diagrammatically indicated at the left of Figure 1 a vertical feed magazine D, it being understood that a plurality of magazines or aligning means are positioned across the width of the belt in such fashion that at each forward movement or step of the belt an aligned row of articles to be handled will move forward from the magazine upon the belt. In order to maintain the transverse alignment of the articles being handled I may employ a plurality of cross-bars D¹ which are preferably moved in unison along or within the supporting frame work B. This cross-bar structure may be given an intermittent movement in timed relation with the successive forward steps of the belt by any suitable mechanism. I illustrate for example the link D² pivoted to the lever D³ which in turn is pivoted upon the transverse shaft D⁴ and may be oscillated through the link D⁵ pivoted to the earlier described member C⁷. In order to feed the articles from the feed magazine D, I may employ any suitable slide D¹² which may be actuated through the lever D¹³ and the rod D¹⁴ in response to oscillation of the lever D³.

As the articles being treated travel with the belt they pass beneath a hopper structure E the details of which need not be herein shown since they do not of themselves form part of the present invention. It will be understood however that the conveying mechanisms above described preferably are so proportioned or adjusted as to position the articles being treated beneath the hopper E at the conclusion of one of the intermittent forward movements of the belt, in such fashion that the articles are properly positioned to receive a charge of material from the hopper. The hopper may, if desired, be mounted for longitudinal adjustment along the frame B. It will be understood that when the articles are positioned beneath such hopper any suitable mechanism is actuated, for example the lever E¹ and the plunger E² to squeeze out or drop upon the articles a charge of desired size. Having received such charge the articles travel forward at the next succeeding movement of the belt and pass beneath the double hopper mechanism hereinafter described. It will be realized that the additional hoppers of the double hopper structure may be used in place of the hopper E or supplementary to it, or may not be used at all, depending upon whether it is desired to deliver charges of one or two or three different materials upon the articles being handled. The double hopper structure includes adjacent hoppers G and G¹ with any suitable means for normally closing the outlets of said hoppers and for opening said outlets and delivering to the articles therebeneath the desired charge of material. I have illustrated only the exterior of said hoppers since the details thereof do not form part of the present invention. It will be realized that the plungers are operated in synchronism with the main drive of the device, for example through the levers G² G³ and the link members G⁴ G⁵.

After the articles have passed beyond said hoppers they enter the part of the mechanism which is specifically novel and which forms the main subject matter of the present application.

Projecting forwardly from the frame member A⁶ are a pair of rack bars H. They are shown as bolted to said frame member at two relatively widely spaced points H¹ H². The portion which projects to the right, as shown in Figure 1, beyond the frame member, is provided on its lower side with the rack teeth H⁴. These teeth are shown as terminating well short of the end of the bars, although the rack portion member extends any desired distance. Mounted for movement along said bars is a frame each side of which includes a member H⁵, which may be a casting, which is recessed in one side, as at H⁶, to receive the rack bar H. The casting is held in position upon the bars by means of a plurality of securing strips H⁷ which pass across the aperture H⁶ and may be bolted to the casting H⁵ above and below it. The two members H⁵ are connected by transverse tie rods H⁸ herein shown, as at Figure 7, at the lower corners of said castings. The structure so formed may be moved as a unit along the rack bars H by rotation of the pinions H⁹ on the shaft H¹⁰ which may be rotated by rotation of the handle H¹¹. H¹² indicates a lock nut screw-threaded upon the end of the shaft adjacent the handle H¹¹, whereby the shaft may be locked to hold the frame in adjusted position.

Mounted upon the supporting frame so formed is a magazine, or a pair of parallel magazine elements, for holding and feeding the upper members to be supplied to complete sandwiches. Referring for example to Figure 12 I I are vertically adjustable magazine supporting slides secured to the frame members $H^5$ for example by the bolts $I^1$ and the nuts $I^2$. These bolts $I^1$ pass through adjustment slots $I^3$ in said frame member. $I^4$ indicates an elongated washer member adapted to serve as a washer for both sets of bolts and nuts, as shown in Figure 12. In order to effect the actual adjustment I employ a shaft $I^5$ having at each end a pinion $I^6$ engaging rack teeth $I^7$ formed on the side of each of the bars I. The shaft $I^5$ carries on one end a handle $I^{20}$ and a lock nut $I^{21}$. When the desired adjustment has been made the nuts $I^2$ are drawn up to lock the magazine support in adjusted position. The magazine proper includes a plurality of tubes $I^8$ with longitudinal forward openings $I^9$. Such magazine tubes are secured in any suitable manner to a transverse strip $I^{10}$ which in turn is bolted or otherwise secured to the transverse bar $I^{11}$ the ends of which are perforated to permit vertical movement along the adjusting screws $I^{12}$. $I^{13}$ $I^{14}$ are adjusting nuts screw-threaded upon said screws $I^{12}$, whereby the height of the magazine members, in relation to the slides I may be adjusted. In order to effect a longitudinal adjustment of the magazine along the main carrying belt I provide elongated apertures $I^{15}$ in the ends of the bar $I^{11}$, through which the adjusting screws $I^{12}$ pass.

I provide the following mechanism for feeding the articles from said magazines. In the slides I are positioned bearing blocks K which are slotted as at $K^1$ to receive a pair of superposed slides $K^2$ $K^3$. The slide $K^3$ is provided with a plurality of V-shaped notches $K^4$ to receive and align the articles to be fed. It will be understood that in use the magazines are normally filled with a stack of the articles to be fed at the initial position of the feed of any individual article, when the preceding article has already passed from beneath the magazine the stack of articles will rest upon the upper slide $K^3$ as shown in Figure 6. After the preceding feeding movement is finished the slide $K^3$ is withdrawn, in relation to the slide $K^2$ below it, and the article to be fed drops to the surface of the slide $K^2$, as shown in Figure 5. By the means below described both slides are moved to the left, as shown in Figure 5, the upper slide $K^3$ moving to the left more rapidly than the lower slide $K^2$. The article being fed, is thus not only removed from beneath the aligned stack of articles in the magazine, but is moved forwardly in relation to the lower slide $K_2$, as shown in Figure 6. When the article has reached the predetermined desired position the lower slide $K^2$ is jerked sharply to the right, permitting the article to be deposited upon the sandwich it is to complete, and the feeding movement is resumed.

In order to obtain the above feeding movement I provide the following mechanism. L indicates a hollow drive shaft which may be driven in any suitable manner in timed relation to the main drive of the entire device. $L^1$ is an eccentric cam adapted to be rotated by the hollow shaft L. Pivoted as at $L^2$ on the frame, upon one of the tie rods $H^8$ is the lever $L^3$ with the grooved roller $L^4$ engaging the eccentric cam $L^1$. $L^5$ indicates a tie rod pivoted to the opposite end of the lever $L^3$ the pivot point being adjustable along the slot $L^6$ in said lever. The opposite end of said tie rod is pivoted as at $L^7$ to a lever $L^8$ which may be pivoted to another tie rod $H^8$ at the opposite corner of the frame member $H^5$. $L^9$ indicates a spring or any other suitable means for maintaining the roller $L^4$ constantly in contact with the cam $L^1$. $L^{10}$ is a link pivoted to the outer end of the lever $L^8$. Its opposite end is pivoted to the bearing member $L^{11}$ which is secured to the upper slide $K^3$. It will be understood that the structure above described is double, the levers, tie rods and the like being located in duplicate at the opposite sides of the device.

Referring to Figure 8, the actuation of the lower slide will be clear upon reference to Figure 8. M indicates a cam rotated by the hollow shaft L, said cam being, in contrast to the generally circular cam $L^1$, of irregular and sharply alternating radius. $M^1$ indicates a lever pivoted as at $M^2$ upon a tie rod $H^8$ and $M^3$ is a flanged roller opposed to the cam M. $M^4$ is a rod pivoted as at $M^5$ along the adjustment slot $M^6$ of the lever $M^1$. At its opposite end it is pivoted as at $M^7$ to the lever $M^8$ which is pivoted as at $M^9$ to another tie rod $H^8$ at the opposite corner of the frame. $M^{10}$ is a link pivoted as at $M^{11}$ to the lever $M^8$. Its opposite end is pivoted to the bearing member $M^{12}$ secured on the lower slide $K^2$. $M^{14}$ is any suitable spring or other means for holding the roller $M^3$ normally in contact with the flange M.

When the slides are actuated to feed the articles forwardly they deliver the articles against an aligning and positioning stop member. This member includes a plurality of V-shaped vertical stop plates N which are secured to a plurality of superposed plates $N^1$ $N^2$, the plate $N^1$ being horizontal, the lower plate $N^2$ being provided with a downwardly inclined portion $N^3$. The two plates, which are mechanically a unit, are pivoted to a transverse member $N^4$, being hinged as at $N^5$. $N^6$ is an adjusting screw passing through the block $N^7$ which is secured to the members $N^1$ and $N^2$, whereby they may be rotated for vertical adjustment of the stop in relation to the transverse member $N^4$. The distance between the pivot point $N^5$ and stop members proper is sufficiently great so that the slight rotation necessary for the desired adjustment is insufficient to move the stop out of substantially perpendicular relation to the belt. The bar $N^4$ may be longitudinally adjustable along the device in the following manner. Each end rests upon a horizontal support $N^7$ integral with the member $H^5$. It may be clamped upon it by the upper clamping members $N^8$ and the bolts $N^9$ with the nuts $N^{10}$. I may provide any suitable mechanism for moving the bar $N^4$ for example the adjusting screws $N^{11}$ which pass through the spacing blocks $N^{12}$. $N^{14}$ is a spacing bar extending across the entire device.

It will be clear from Figures 5, 6 and 7, for example, that when the articles have been moved by the slides $K^2$ $K^3$ against the stop members $N$, they are then subjected to downward pressure by means of plungers which tend to thrust them downwardly against the lower sandwich members which are conveyed along the belt $B^3$. It will be realized that a separate plunger is provided for each magazine $I^8$ and stop member $N$. I therefore provide to support said plungers, the space bars $O$ $O^1$ which are secured together for example by the bolts $O^2$ and nuts $O^3$, and which are spaced apart by the spacers $O^4$. Positioned along said bars are the plunger stems $O^5$, each such stem being provided with the lower engaging member $O^6$ and the intermediate flange $O^7$ adapted to be drawn up against the bottoms of the bars $O$ $O^1$. $O^8$ is a washer adapted to engage the tops of said bars and $O^9$ is the nut whereby the plunger is drawn in position against said bars. It will be realized of course that by loosening the nut $O^9$ the plunger may be moved laterally along said bars to obtain the necessary spacing. Referring for example to Figure 4 the bars, or, as shown the forward bar $O^1$, is provided with an off-set portion $O^{10}$ longitudinally slotted as at $O^{11}$, through which slots pass the adjusting screws $O^{12}$. Upon said screws are the adjusting nuts $O^{13}$ and $O^{14}$, whereby the position of the plunger assembly may be vertically adjusted and locked. If necessary I may employ an additional supplemental locking screw $O^{15}$, which may also serve to aid in obtaining an accurate adjustment along the slots $O^{11}$.

The adjusting screws $O^{12}$ terminate in vertical slides $P$ which slide between the opposed bars $P^1$ $P^2$ which are mounted upon or secured to the casting $H^5$. The member $P$ terminates in the outwardly projecting lug $P^3$ which rides upon the cam $P^4$ upon the hollow shaft $L$, as shown for example in Figure 7. Thus rotation of the shaft $L$ will move the entire plunger assembly up and down, as the cam $P^4$ rotates, in response to the variations in radius of said cam.

At every feeding operation I prefer to lift the belt $B^3$ into engagement with the lower edge of the stops $N$, as shown for example in Figure 6, in order that both the upper member and the lower member of the sandwich shall be aligned against the stop $N$ when the plungers move the upper member downwardly into final position. I desire to synchronize the movement so that the belt will rise into the position shown in Figures 6 and 7 when the upper member is released for superposition upon the lower member. When the sandwich is completed and the plunger thrusts it into lower position, the belt is desirably lowered as shown in dotted line in Figure 7 to permit the completed sandwich to pass forwardly beneath the stop. I obtain this result by the following mechanism. Referring first to Figure 11 $R$ represents a sprocket loose on the hollow shaft $L$. It is provided with an outwardly projecting clutch stud $R^1$. Keyed on the shaft $L$ for longitudinal movement therealong is the clutch member $R^2$ having on it the cam member $R^3$. It is provided, in opposition to the sprocket $R$ with an aperture $R^4$ in which is positioned a stud or lug $R^5$ opposed to the member $R^1$. In order to engage the clutch thus formed and to rotate the shaft $L$ and with it the cam $R^3$ and the other cams previously herein described I provide the rod $R^6$ positioned in the hollow of the shaft $L$ and terminating in a push and pull handle $R^7$, for manual control thereof. In Figure 11 the clutch is shown as engaged. Referring to Figure 2 $R^8$ is a lever having at its outer end a roller $R^9$ riding upon the cam $R^3$. The lever is loose upon the shaft $R^{10}$. $R^{11}$ is a second lever keyed to the shaft $R^{10}$ and provided with a laterally extending lug $R^{12}$ overlying the lever $R^8$. $R^{13}$ is an adjusting screw therein whereby the shaft $R^{10}$ may be rotated in relation to the lever $R^8$. The shaft $R^{10}$ is mounted in bearings $R^{14}$ at each side of the device, said bearings being mounted upon the frame structure $H^5$. Upon said shaft $R^{10}$ are a plurality of lifting bars $R^{15}$ connected by a lifting rod $R^{16}$ which is adapted to engage the lower side of the belt. As the cam $R^3$ rotates it will be understood that the lifting levers and bar are moved from the position shown in dotted lines in Figure 7 to the lifting position shown in full line in Figure 7 and are then returned to the dotted line position, the belt being lifted once for each forward movement or step.

Associated with a shaft $R^{10}$ is a brake band $S$ which passes about the bearing $R^{13}$. $S^1$ is a drum mounted on the shaft $L$ about which passes the brake band $S$. I provide any suitable take-up means for adjusting the tension of the brake band, but illustrate an upstanding lug $S^2$, a screw-threaded member $S^3$ passing therethrough and a take-up nut $S^4$ thereupon.

I have not described in detail the drive of the entire sandwich machine mechanism, since the drive details do not of themselves form part of the present invention. I have shown however, in Figure 2 the driving connection for that part of the mechanism which forms the primary subject matter of the present application.

Mounted on one side of the vertical supports A⁴ is a shaft T carrying a pair of sprocket gears T¹ T². The sprocket T² is driven by a sprocket chain T³ passing around a sprocket T⁴ of smaller diameter, on the pin T⁵. Connected to or integral with the sprocket T⁴ is another sprocket gear of like diameter driven by the chain T⁶ from any suitable driving mechanism on the main structure not shown in detail.

V is a sprocket chain passing about the sprocket gears T¹, R and idler gear V¹ on the pin or bolt V² mounted in the supporting links V³ connected to the tie rod H⁸. V⁴ is a link one end of which is pivotally mounted on the shaft T, the opposite end being carried by the bolt V². In mesh with the chain V is a take-up or idler sprocket V⁶, pivoted as at V⁷ to a link V⁸. L⁹ indicates a spring holding the idler V⁶ constantly in contact with the chain V, its function being to take up any slack in the chain caused by longitudinal movement of the frame members H⁵ along the rack bars H.

The use and operation of my invention are as follows:

My invention is directed to a sandwiching machine or a sandwiching attachment for an icing machine, and concerns the details of such sandwiching device and the combination of the sandwiching device with the icing machine. Referring generally to Figure 1 the complete mechanism includes an endless conveyor B³ to which is imparted by any desired means, a step by step conveying movement from left to right of the device as shown in Figure 1. Any desired mechanism may be employed for delivering to the upper surface of such conveyor a plurality of lower sandwich elements. They may be stacked in the member or members D and any suitable mechanism may be employed for delivering them thence to the belt B³. The members move along the belt as the belt moves and their initial movement on the belt is positively controlled or imparted by the reciprocating slide D¹. As the belt moves forwardly the articles, with or without the action of the slide D¹, pass beneath the hopper E which may contain any desired material, icing, filling or the like. Each of the articles passing therebeneath may, if the operator desired, receive a charge of such material. The articles continue their progress through the device until they pass beneath the hoppers G and G¹ which may contain further icing or filling material. It will be understood that each article may receive a charge of material from any one of said three hoppers or from any combination thereof, depending upon the type of filling desired. The articles so treated pass forwardly until they reach the sandwiching device proper shown for example in Figure 2, which is adjustable along the machine, as by the rotation of the pinions H⁹ which engage the rack bar teeth H⁴. The sandwiching assembly has mounted on it the vertical magazines or tubes I⁸. At each forward movement of the belt B³ a biscuit or sandwich element is fed from each of such tubes and is moved forwardly against the V-shaped notches K⁴ by the cooperation of the slides K² and K³, the operation of which has earlier been described. The operation of these slides is shown in considerable detail in Figures 7, 8 and 9. Obviously the details of this mechanism may be considerably varied but it is essential that at a given point or along a given zone the earlier sandwich elements, with the superposed icing or filling or the like, are positioned beneath the corresponding upper elements. When the upper and lower elements are so positioned, the upper elements are released for downward movement, as by the withdrawal of the slide K² and are then thrust positively downwardly upon the lower elements. At the same time the belt B³ is upwardly moved, as by the lever R¹⁵. The position of the opposed parts at the time of completion of the sandwich is shown in Figure 7.

It will be realized that whereas I have described and shown a practical and operative device nevertheless many changes might be made in the size, shape, number and disposition of parts without departing from the spirit of my invention. I therefore wish my description and drawings to be taken as in a broad sense illustrative and diagrammatic rather than as limiting me to my specific showing.

I claim:

1. In a sandwiching machine, means for advancing the lower member of the sandwich through such machine, a stop adapted to engage and position said lower member, means for positioning an upper member above said lower and against said stop, means for discharging the upper member and for superposing it upon said lower member, and means for subsequently advancing the completed sandwich beyond said stop.

2. In a sandwiching machine, means for advancing the lower member of the sandwich through such machine, a stop adapted to engage and position said lower member, means for positioning an upper member above said lower and against said stop, means for discharging the upper member and for superposing it upon said lower member, means for moving the lower member upwardly and for moving the upper member downwardly, while aligned against said stop, and means for subsequently advancing the completed sandwich beyond said stop.

3. In a sandwiching machine, means for advancing the lower member, means for positioning it at a predetermined location, means for positioning the upper member above said lower member, means for moving the lower member upwardly and for moving the upper member downwardly, into sandwich forming contact, and means for subsequently advancing the completed sandwich.

4. In a sandwiching machine, means for advancing the lower member of the sandwich through such machine, means for positioning it at a predetermined location, means for positioning a stack of upper members thereabove, means for advancing an upper member from such stack above said lower member, including a plurality of slides and means for moving them beneath said stack, one of said slides being adapted to receive said lower member, another of said slides being adapted to move said member forwardly in relation to the receiving slide.

5. In a sandwiching machine, a conveyor member and means for actuating it, means for delivering to said conveyor lower sandwich members, stop means for positioning said lower members at a predetermined point in their travel through the machine, means for positioning an upper member above each such lower member at such point, said stop means and said positioning means being adjustable longitudinally along said conveyor.

6. In a sandwiching machine, a flexible conveyor and means for actuating it, means for delivering to said conveyor lower sandwich members, stop means located above said conveyor and adapted to position said lower members at a predetermined point in their travel through the machine, said flexible conveyor being normally separated from said stop means by a distance sufficient to permit the passage of the sandwich, means for lifting said conveyor toward said stop means, means for positioning upper sandwich members against said stop means and above the lower member, and placing said upper members upon said lower members, and means for thereafter lowering the conveyor and for permitting the passage beyond the stop of the completed sandwich.

7. In a sandwiching machine, a flexible conveyor and means for actuating it, means for delivering to said conveyor lower sandwich members, stop means located above said conveyor and adapted to position said lower members at a predetermined point in their travel through the machine, said flexible conveyor being normally separated from said stop means by a distance sufficient to permit the passage of the sandwich, means for lifting said conveyor toward said stop means, means for positioning upper sandwich members against said stop means and above the lower member, and placing said upper members upon said lower members, and means for thereafter lowering the conveyor and for permitting the passage beyond the stop of the completed sandwich, said stop means and said upper member positioning means being longitudinally adjustable along said conveyor.

8. In a sandwiching machine, a conveyor, and means for actuating it, means for delivering to said conveyor lower sandwich members, means for placing upon said lower members a sandwich filling, stop means, adjustable longitudinally along said conveyor, for locating said lower members at a predetermined point along said conveyor and means for positioning thereabove at such predetermined halting point the upper members for each sandwich, and means for moving the completed sandwich beyond said stop means.

9. In a sandwiching machine, a conveyor, and means for actuating it, means for delivering to said conveyor lower sandwich members, means for placing upon said lower members a sandwich filling, stop means, adjustable longitudinally along said conveyor, for locating said lower members at a predetermined point along said conveyor, magazine means, associated with said stop means and longitudinally adjustable therewith, for maintaining a supply of sandwich upper members, means for feeding said members from said magazines and for positioning them above said lower members against said stop means, and means for moving the completed sandwich beyond said stop means.

10. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, means for delivering from said magazine upper sandwich members, means for positioning said upper sandwich members, against said stop, above the lower sandwich members halted thereagainst, means for assembling said upper and lower members to form sandwiches and means for permitting the passage of the completed sandwiches beyond the stop.

11. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, said stop means being longitudinally movable in relation to said frame, a magazine mounted on said frame, means for delivering from said magazine upper sandwich members, means for positioning said upper sandwich members, against said stop, above the lower sandwich members halted thereagainst, means for assembling said upper and lower members to form sandwiches and means for permitting the passage of the completed sandwiches beyond the stop.

12. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, said stop means being vertically adjustable in relation to said frame, a magazine mounted on said frame, means for delivering from said magazine upper sandwich members, means for positioning said upper sandwich members, against said stop, above the lower sandwich members halted thereagainst, means for assembling said upper and lower members to form sandwiches and means for permitting the passage of the completed sandwiches beyond the stop.

13. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, said magazine being vertically adjustable in relation to said frame, means for delivering from said magazine upper sandwich members, means for positioning said upper sandwich members, against said stop, above the lower sandwich members halted thereagainst, means for assembling said upper and lower members to form sandwiches and means for permitting the passage of the completed sandwiches beyond the stop.

14. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, said magazine being longitudinally adjustable in relation to said frame, means for delivering from said magazine upper sandwich members, means for positioning said upper sandwich members, against said stop, above the lower sandwich members halted thereagainst, means for assembling said upper and lower members to form sandwiches and means for permitting the passage of the completed sandwiches beyond the stop.

15. In combination with a sandwiching machine having a conveyor and means for delivering sandwiching members to said conveyor, a supporting frame longitudinally adjustable along said conveyor, stop means positioned on said frame and adapted to halt the lower sandwich members at a predetermined point, a magazine mounted on said frame, means for delivering from said magazine upper sandwich members, and for positioning them against said stop above the lower sandwich members halted thereagainst, including a pair of slides, one superposed above the other, the lower of said slides being adapted to receive and support the upper sandwich members delivered from the magazine and to convey them toward the stop, the upper being adapted to move said upper sandwich members along the lower slide and against said stop, and means for withdrawing the lower slide, when the upper sandwich member is positioned against said stop by said upper slide.

16. In combination with a sandwiching machine having a flexible conveyor and means for delivering lower sandwich members to said conveyor, a supporting frame longitudinally adjustable along said conveyor, stop means positioned on said frame and adapted to halt the lower sandwich members at a predetermined point in their travel along said conveyor, means for delivering upper sandwich members against said stop, above the lower sandwich members halted thereagainst, means, associated with said frame, for raising said flexible conveyor to cause the sandwich members traveling therealong to engage said stop, and means for lowering said conveyor to permit the passage beneath said stop of the completed sandwiches.

17. In combination with a sandwiching machine having a flexible conveyor and means for delivering lower sandwich members to said conveyor, stop means adapted to halt the lower sandwich members at a predetermined point in their travel along said conveyor, means for delivering upper sandwich members against said stop, above the lower sandwich members halted thereagainst, means for raising said flexible conveyor to cause the sandwich members traveling therealong to engage said stop, and means for lowering said conveyor to permit the passage beneath said stop of the completed sandwiches.

18. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, means for delivering upper sandwich members from said magazine and for delivering them against said stop means and above the lower sandwich members halted thereagainst, and positive means for thrusting said upper sandwich members downwardly against said lower sandwich members.

19. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, means for delivering upper sandwich members from said magazine and for delivering them against said stop means and above the lower sandwich members halted thereagainst, and positive means for thrusting said upper sandwich members downwardly against said lower sandwich members including a plunger and means for imparting generally vertical movement to it.

20. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, means for delivering upper sandwich members from said magazine and for delivering them against said stop means and above the lower sandwich members halted thereagainst, and positive means for thrusting said upper sandwich members downwardly against said lower sandwich members including a plunger and means for imparting generally vertical movement to it and means for adjusting said plunger longitudinally in relation to said frame.

21. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, means for delivering upper sandwich members from said magazine and for delivering them against said stop means and above the lower sandwich members halted thereagainst, and positive means for thrusting said upper sandwich members downwardly against said lower sandwich members including a plunger and means for imparting generally vertical movement to it, and means for adjusting said plunger transversely in relation to said frame.

22. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, means for delivering upper sandwich members from said magazine and for delivering them against said stop means and above the lower sandwich members halted thereagainst, and positive means for thrusting said upper sandwich members downwardly against said lower sandwich members including a plunger and means for imparting generally vertical movement to it and means for adjusting said plunger vertically in relation to said frame.

23. In combination with a sandwiching machine having a conveyor and means for delivering lower sandwich members to said conveyor at a plurality of transversely disposed points, a supporting frame longitudinally adjustable along said conveyor, stop means, positioned on said frame, adapted to halt the lower sandwich members at a predetermined point, storage means on said frame, means for delivering upper sandwich members from said storage means against said stop means and above the lower sandwich members halted thereagainst, a plurality of transversely aligned plungers positioned adjacent said stop means and overlying the sandwich members halted by said stop means, and means for imparting vertical movement to said plungers.

24. In combination with a sandwiching machine having a conveyor and means for delivering lower sandwich members to said conveyor at a plurality of transversely disposed points, a supporting frame longitudinally adjustable along said conveyor, stop means, positioned on said frame, adapted to halt the lower sandwich members at a predetermined point, storage means on said frame, means for delivering upper sandwich members from said storage means against said stop means and above the lower sandwich members halted thereagainst, a plurality of transversely aligned plungers positioned adjacent said stop means and overlying the sandwich members halted by said stop means, and means for imparting vertical movement to said plungers, a transversely disposed supporting member for said plungers and means for vertically adjusting it in relation to said frame.

25. In combination with a sandwiching machine having a conveyor and means for delivering lower sandwich members to said conveyor at a plurality of transversely disposed points, a supporting frame longitudinally adjustable along said conveyor, stop means, positioned on said frame, adapted to halt the lower sandwich members at a predetermined point, storage means on said frame, means for delivering upper sandwich members from said storage means against said stop means and above the lower sandwich members halted thereagainst, a plurality of transversely aligned plungers positioned adjacent said stop means and overlying the sandwich members halted by said stop means, and means for imparting vertical movement to said plungers, a transversely disposed supporting member for said plungers and means for longitudinally adjusting it in relation to said frame.

26. In combination with a sandwiching machine having a conveyor and means for delivering lower sandwich members to said conveyor at a plurality of transversely disposed points, a supporting frame longitudinally adjustable along said conveyor, stop means, positioned on said frame, adapted to halt the lower sandwich members at a predetermined point, storage means on said frame, means for delivering upper sandwich members from said storage means against said stop means and above the lower sandwich members halted thereagainst, a plurality of transversely aligned plungers positioned adjacent said stop means and overlying the sandwich members halted by said stop means, and means for imparting vertical movement to said plungers, a transversely disposed supporting member for said plungers and means for adjusting said plungers therealong.

27. In combination with a sandwiching machine having a conveyor and means for delivering lower sandwich members to said conveyor, a supporting frame longitudinally adjustable along said conveyor, stop means positioned on said frame and adapted to halt the lower sandwich members at a predetermined point, a magazine mounted on said frame, means for delivering upper sandwich members from said magazine and for delivering them against said stop means and above the lower sandwich members halted thereagainst, including a plurality of slides, one superposed upon the other, a cam shaft, a pair of cams rotated thereby, a lever, pivoted on said frame, opposed to each said cam, a linkage connection between each said lever and one of said slides, position means for thrusting the upper sandwich members downwardly against the lower sandwich members when positioned thereabove, including a plunger, and means for imparting generally vertical movement to said plunger including a third cam adapted to be rotated in response to rotation of said cam shaft, and an actuating connection between said cam and said plunger.

28. In a sandwiching machine, means for advancing the lower member of the sandwiches through such machine, means for positioning a filling thereupon, and means for positioning the upper member of the sandwich above said lower member at a predetermined point in its travel through said machine, and means for adjusting said positioning device along said machine.

29. In a sandwiching machine, means for advancing the lower member of the sandwiches through such machine, means for positioning a filling thereupon, and means for positioning the upper member of the sandwich above said lower member at a predetermined point in its travel through said machine, and means for adjusting said positioning device along said machine, said positioning device including a stop member, stack supporting means for maintaining a stack of upper members, means for moving members from said stack toward said stop member, and means for releasing them above the lower sandwich members when said lower members are positioned adjacent said stop member.

30. In association with a sandwiching machine which includes a flexible conveyor member and means for imparting a step by step movement to it and means for feeding the lower members of the sandwich thereto, a positioning assembly for positioning the upper members upon said lower members to form sandwiches, said assembly being longitudinally movable as a unit along said conveyor.

31. In association with a sandwiching machine which includes a flexible conveyor member and means for imparting a step by step movement to it and means for feeding the lower members of the sandwich thereto, a positioning assembly for positioning the upper members upon said lower members to form sandwiches, said assembly being longitudinally movable as a unit along said conveyor and including means for maintaining a stack of upper members, means for moving said members from beneath said stack, a stop and means for thrusting said upper members against said stop and means for releasing said members for downward movement along said stop when a lower member is positioned adjacent said stop.

32. In association with a sandwiching machine which includes a flexible conveyor member and means for imparting a step by step movement to it and means for feeding the lower members of the sandwich thereto, a positioning assembly for positioning the upper members upon said lower members to form sandwiches, said assembly being longitudinally movable as a unit along said conveyor and including means for maintaining a supply of upper members, means for positioning said upper members above the lower members at a predetermined point in the excursion of said lower members along or with the conveyor and means for releasing said upper members for downward movement toward said lower members.

33. In association with a sandwiching machine which includes a flexible conveyor member and means for imparting a step by step movement to it and means for feeding the lower members of the sandwich thereto, a positioning assembly for positioning the upper members upon said lower members to form sandwiches, said assembly being longitudinally movable as a unit along said conveyor and including means for maintaining a supply of upper members, a stop and means for thrusting said upper members against said stop, including a supporting slide and a thrusting slide thereabove, and means for withdrawing said supporting slide when the member is positioned against said stop and above a lower member.

34. In association with a sandwiching machine which includes a flexible conveyor member and means for imparting a step by step movement to it and means for feeding the lower members of the sandwich thereto, a positioning assembly for positioning the upper members upon said lower members to form sandwiches, said assembly being longitudinally movable as a unit along said conveyor and including means for maintaining a supply of upper members, a stop and means for thrusting said upper members against said stop, including a supporting slide and a thrusting slide thereabove, and means for withdrawing said supporting slide when the member is positioned against said stop and above a lower member, and additional means for positively thrusting said upward member downwardly toward said lower member.

35. In association with a sandwiching machine which includes a flexible conveyor member and means for imparting a step by step movement to it and means for feeding the lower members of the sandwich thereto, a positioning assembly for positioning the upper members upon said lower members to form sandwiches, said assembly being longitudinally movable as a unit along said conveyor and including means for maintaining a supply of upper members, a stop and means for thrusting said upper members against said stop, including a supporting slide and a thrusting slide thereabove, and means for withdrawing said supporting slide when the member is positioned against said stop and above a lower member and means for lifting said flexible conveyor sufficiently to interpose said stop across the path of movement of the lower members conveyed thereupon.

36. In a sandwiching machine, means for advancing lower sandwich members through such machine, a plurality of independent means for positioning fillings thereon, and means, adjustable along said machine, for positioning an upper sandwich member of the sandwich above each lower member at a predetermined point in its travel through said machine.

37. In a sandwiching machine, an endless conveyor belt, and means for feeding lower sandwich members thereto, means for moving said belt and lower sandwich members forwardly through said machine, means for positioning fillings upon said lower sandwich members, and means, adjustable along said belt, for positioning an upper sandwich member above each lower member at a predetermined point in its travel through said machine.

38. In a sandwiching machine, an endless conveyor belt, and means for feeding lower sandwich members thereto, means for moving said belt and lower sandwich members forwardly through said machine, a plurality of separate means for positioning fillings upon said lower sandwich members, and means, adjustable along said belt, for positioning an upper sandwich member above each lower member at a predetermined point in its travel through said machine.

Signed at Chicago, county of Cook and State of Illinois, this 30th day of June, 1927.

FERDINANDO G. SALERNO.